(12) United States Patent
Nishida et al.

(10) Patent No.: US 7,799,458 B2
(45) Date of Patent: Sep. 21, 2010

(54) NONAQUEOUS ELECTROLYTIC SECONDARY BATTERY AND METHOD OF MANUFACTURING THE SAME

(75) Inventors: Nobumichi Nishida, Itano-gun (JP); Shinya Miyazaki, Naruto (JP); Masatoshi Takahashi, Itano-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 1171 days.

(21) Appl. No.: 11/429,259

(22) Filed: May 8, 2006

(65) Prior Publication Data

US 2006/0204852 A1   Sep. 14, 2006

Related U.S. Application Data

(62) Division of application No. 10/107,208, filed on Mar. 28, 2002, now abandoned.

(30) Foreign Application Priority Data

Mar. 30, 2001  (JP) .............................. 2001-100897

(51) Int. Cl.
    *H01M 4/52* (2010.01)
(52) U.S. Cl. .................................. 429/231.3
(58) Field of Classification Search ............... 429/231.3
    See application file for complete search history.

(56) References Cited

U.S. PATENT DOCUMENTS

| 4,497,726 | A  | * | 2/1985 | Brule et al. ............... 252/182.1 |
| 6,579,475 | B2 | * | 6/2003 | Gao et al. ................. 252/521.2 |
| 6,613,479 | B2 |   | 9/2003 | Fukuzawa et al. |
| 6,949,233 | B2 | * | 9/2005 | Kweon et al. ............ 423/179.5 |

2001/0036578 A1  11/2001  Nishida et al.

FOREIGN PATENT DOCUMENTS

| JP | 60-21805  | 2/1985 |
| JP | 6-243871  | 9/1994 |
| JP | 6-333565  | 12/1994 |
| JP | 7-33443   | 2/1995 |
| JP | 7-033443  | 2/1995 |
| JP | 8-321326  | 12/1996 |

(Continued)

OTHER PUBLICATIONS

Korean Official Action and English translation.

(Continued)

*Primary Examiner*—Tracy Dove
(74) *Attorney, Agent, or Firm*—Nixon & Vanderhye P.C.

(57) ABSTRACT

In a nonaqueous electrolytic secondary battery according to the invention, hexagonal system lithium containing cobalt composite oxide having a crystallite size in a (110) vector direction of 1000 Å or more and having a halogen compound added thereto by burning at time of synthesis is used as a positive electrode active material. By measuring a pH value of a filtrate obtained by dispersing, in water, the lithium containing cobalt composite oxide having the halogen compound added thereto by the burning at time of the synthesis and a crystallite size in the (110) vector direction of 1000 Å or more, a value of 9.6 to 10.1 is obtained. By using the lithium containing cobalt composite oxide as a positive electrode active material, a high temperature cycle property can be enhanced.

15 Claims, 4 Drawing Sheets

| TYPE OF ACTIVE MATERIAL | COMPOSITION OF ACTIVE MATERIAL (GENERAL FORMULA) | TIMING FOR ADDING HALOGEN | TYPE OF HALOGEN (wt%) | CRYSTALLITE SIZE (Å) | pH VALUE |
|---|---|---|---|---|---|
| a 1 | $LiCoO_2$ | AT TIME OF SYNTHESIS | F (0.05) | 1045 | 9.8 |
| b 1 | $LiCoO_2$ | AT TIME OF SYNTHESIS | F (0.0007) | 1030 | 10.1 |
| c 1 | $LiCoO_2$ | AT TIME OF SYNTHESIS | F (0.001) | 1050 | 9.8 |
| d 1 | $LiCoO_2$ | AT TIME OF SYNTHESIS | F (5.0) | 1048 | 9.6 |
| e 1 | $LiCoO_2$ | AT TIME OF SYNTHESIS | F (7.0) | 1053 | 9.6 |
| f 1 | $LiCoO_2$ | AT TIME OF SYNTHESIS | F (0.01) | 1045 | 9.8 |
| g 1 | $LiCoO_2$ | AT TIME OF SYNTHESIS | F (0.3) | 1050 | 9.6 |
| h 1 | $LiCoO_2$ | AT TIME OF SYNTHESIS | F (0.5) | 1052 | 9.6 |
| s 1 | $LiCoO_2$ | NONE | | 1042 | 10.6 |
| t 1 | $LiCoO_2$ | AT TIME OF SYNTHESIS | F (0.05) | 700 | 9.6 |
| u 1 | $LiCoO_2$ | NONE | | 690 | 9.6 |

FOREIGN PATENT DOCUMENTS

| | | |
|---|---|---|
| JP | 10-255794 | 9/1998 |
| JP | 11-111291 | 4/1999 |
| JP | 2000-099616 | 10/2001 |
| KR | 2000-74294 | 12/2000 |
| KR | 2000-0074691 | 12/2000 |

OTHER PUBLICATIONS

Yonezawa et al, "Effect of LiF addition at preparation of $LiCoO_2$ on its properties . . . ", Journal of Fluorine Chemistry, 87 (1998), 141-143.

* cited by examiner

FIG. 1

| TYPE OF ACTIVE MATERIAL | COMPOSITION OF ACTIVE MATERIAL (GENERAL FORMULA) | TIMING FOR ADDING HALOGEN | TYPE OF HALOGEN (wt%) | CRYSTALLITE SIZE (Å) | pH VALUE |
|---|---|---|---|---|---|
| a1 | $LiCoO_2$ | AT TIME OF SYNTHESIS | F (0.05) | 1045 | 9.8 |
| b1 | $LiCoO_2$ | AT TIME OF SYNTHESIS | F (0.0007) | 1030 | 10.1 |
| c1 | $LiCoO_2$ | AT TIME OF SYNTHESIS | F (0.001) | 1050 | 9.8 |
| d1 | $LiCoO_2$ | AT TIME OF SYNTHESIS | F (5.0) | 1048 | 9.6 |
| e1 | $LiCoO_2$ | AT TIME OF SYNTHESIS | F (7.0) | 1053 | 9.6 |
| f1 | $LiCoO_2$ | AT TIME OF SYNTHESIS | F (0.01) | 1045 | 9.8 |
| g1 | $LiCoO_2$ | AT TIME OF SYNTHESIS | F (0.3) | 1050 | 9.6 |
| h1 | $LiCoO_2$ | AT TIME OF SYNTHESIS | F (0.5) | 1052 | 9.6 |
| s1 | $LiCoO_2$ | NONE | | 1042 | 10.6 |
| t1 | $LiCoO_2$ | AT TIME OF SYNTHESIS | F (0.05) | 700 | 9.6 |
| u1 | $LiCoO_2$ | NONE | | 690 | 9.6 |

FIG. 2

| TYPE OF BATTERY | PROPERTY VALUE OF POSITIVE ELECTRODE ACTIVE MATERIAL | | | AVERAGE DISCHARGE VOLTAGE (V) | INITIAL CAPACITY (mAh) | HIGH TEMPERATURE CAPACITY RETENTION RATE (%) | TG MASS DECREASE (%) |
|---|---|---|---|---|---|---|---|
| | CRYSTALLITE SIZE (Å) | TYPE OF HALOGEN (wt%) | pH VALUE | | | | |
| A | 1045 | F (0.05) | 9.8 | 3.53 | 1648 | 83 | 8.9 |
| B | 1030 | F (0.0007) | 10.1 | 3.53 | 1648 | 80 | 8.8 |
| C | 1050 | F (0.001) | 9.8 | 3.52 | 1648 | 82 | 8.7 |
| D | 1048 | F (5.0) | 9.6 | 3.52 | 1650 | 82 | 8.7 |
| E | 1053 | F (7.0) | 9.6 | 3.51 | 1574 | 80 | 8.7 |
| F | 1045 | F (0.01) | 9.8 | 3.54 | 1650 | 83 | 8.8 |
| G | 1050 | F (0.3) | 9.6 | 3.53 | 1650 | 83 | 8.8 |
| H | 1052 | F (0.5) | 9.6 | 3.51 | 1649 | 82 | 8.8 |
| S | 1042 | NONE | 10.6 | 3.52 | 1650 | 63 | 8.8 |
| T | 700 | F (0.05) | 9.6 | 3.58 | 1643 | 76 | 13.8 |
| U | 690 | NONE | 9.6 | 3.58 | 1652 | 75 | 13.9 |

FIG. 3

| TYPE OF ACTIVE MATERIAL | COMPOSITION OF ACTIVE MATERIAL (GENERAL FORMULA) | TIMING FOR ADDING HALOGEN | TYPE OF HALOGEN (wt%) | CRYSTALLITE SIZE (Å) | pH VALUE |
|---|---|---|---|---|---|
| i1 | $LiCo_{0.999}Ti_{0.001}O_2$ | AT TIME OF SYNTHESIS | F (0.05) | 1050 | 9.8 |
| j1 | $LiCo_{0.999}Ti_{0.001}O_2$ | AT TIME OF SYNTHESIS | Cl (0.05) | 1047 | 9.9 |
| k1 | $LiCo_{0.995}Ti_{0.005}O_2$ | AT TIME OF SYNTHESIS | F (0.05) | 1032 | 9.9 |
| l1 | $LiCo_{0.999}Ti_{0.001}O_2$ | AT TIME OF SYNTHESIS | F (0.0007) | 1052 | 10.3 |
| m1 | $LiCo_{0.999}Ti_{0.001}O_2$ | AT TIME OF SYNTHESIS | F (0.001) | 1051 | 9.9 |
| n1 | $LiCo_{0.999}Ti_{0.001}O_2$ | AT TIME OF SYNTHESIS | F (5.0) | 1040 | 9.8 |
| o1 | $LiCo_{0.999}Ti_{0.001}O_2$ | AT TIME OF SYNTHESIS | F (7.0) | 1042 | 9.8 |
| p1 | $LiCo_{0.999}Ti_{0.001}O_2$ | AT TIME OF SYNTHESIS | F (0.01) | 1048 | 9.8 |
| q1 | $LiCo_{0.999}Ti_{0.001}O_2$ | AT TIME OF SYNTHESIS | F (0.3) | 1047 | 9.8 |
| r1 | $LiCo_{0.999}Ti_{0.001}O_2$ | AT TIME OF SYNTHESIS | F (0.5) | 1043 | 9.8 |
| v1 | $LiCo_{0.999}Ti_{0.001}O_2$ | NONE |  | 1030 | 10.7 |
| w1 | $LiCo_{0.995}Ti_{0.005}O_2$ | NONE |  | 1010 | 10.9 |
| x1 | $Li_{1.04}Mn_{1.86}Cr_{0.1}O_4$ | AT TIME OF SYNTHESIS | F (0.05) | UNMEASURED | 7.3 |
| y1 | $LiCo_{0.999}Ti_{0.001}O_2$ | AT TIME OF SYNTHESIS | F (0.05) | 1040 | 10.6 |
| z1 | $Li_{1.04}Mn_{1.86}Cr_{0.1}O_4$ | NONE |  | UNMEASURED | 7.3 |

FIG. 4

| TYPE OF BATTERY | PROPERTY VALUE OF POSITIVE ELECTRODE ACTIVE MATERIAL | | | AVERAGE DISCHARGE VOLTAGE (V) | INITIAL CAPACITY (mAh) | HIGH TEMPERATURE CAPACITY RETENTION RATE (%) | TG MASS DECREASE (%) |
|---|---|---|---|---|---|---|---|
| | CRYSTALLITE SIZE (Å) | TYPE OF HALOGEN (wt%) | pH VALUE | | | | |
| I | 1050 | F (0.05) | 9.8 | 3.65 | 1650 | 85 | 8.8 |
| J | 1047 | Cl (0.05) | 9.9 | 3.65 | 1641 | 82 | 8.8 |
| K | 1032 | F (0.05) | 9.9 | 3.67 | 1652 | 84 | 8.8 |
| L | 1052 | F (0.0007) | 10.3 | 3.64 | 1647 | 69 | 8.7 |
| M | 1051 | F (0.001) | 9.9 | 3.65 | 1652 | 84 | 8.7 |
| N | 1041 | F (5.0) | 9.8 | 3.63 | 1642 | 83 | 8.8 |
| O | 1042 | F (7.0) | 9.8 | 3.62 | 1580 | 84 | 8.8 |
| P | 1048 | F (0.01) | 9.8 | 3.66 | 1651 | 85 | 8.7 |
| Q | 1047 | F (0.3) | 9.8 | 3.65 | 1650 | 85 | 8.8 |
| R | 1043 | F (0.5) | 9.8 | 3.63 | 1646 | 83 | 8.7 |
| V | 1030 | NONE | 10.7 | 3.65 | 1648 | 58 | 8.8 |
| W | 1010 | NONE | 10.9 | 3.67 | 1644 | 50 | 8.9 |
| X | UNMEASURED | NONE | 7.3 | 3.70 | 1231 | 55 | UNMEASURED |
| Y | 1040 | F (0.05) AT TIME OF SYNTHESIS | 10.6 | 3.63 | 1590 | 60 | 8.8 |
| Z | UNMEASURED | NONE | 7.3 | 3.71 | 1238 | 53 | UNMEASURED |

NONAQUEOUS ELECTROLYTIC SECONDARY BATTERY AND METHOD OF MANUFACTURING THE SAME

This application is a divisional of application Ser. No. 10/107,208 filed Mar. 28, 2002 now abandoned which in turn claims priority of Japanese application Serial No. 2001-100897 filed Mar. 30, 2001, the entire content of which is hereby incorporated by reference in this application.

BACKGROUND OF THE INVENTION

1. Field of the Invention

The present invention relates to a nonaqueous electrolytic secondary battery comprising a positive electrode active material capable of intercalating and deintercalating a lithium ion, a negative electrode active material capable of intercalating and deintercalating the lithium ion, and a nonaqueous electrolyte, and a method of manufacturing the nonaqueous electrolytic secondary battery.

2. Description of the Related Art

For a battery to be used in portable electronic and communicating equipment such as a small-sized video camera, a mobile telephone and a notebook personal computer, recently, a nonaqueous electrolytic secondary battery having an alloy or a carbon material capable of intercalating and deintercalating a lithium ion as a negative electrode active material and lithium containing transition metal oxide, for example, lithium cobalt oxide ($LiCoO_2$), lithium nickel oxide ($LiNiO_2$) or lithium manganese oxide ($LiMn_2O_4$) as a positive electrode active material has been put into practical use to be a battery having a small size, a light weight and a high capacity and capable of carrying out a charge and discharge.

Since lithium nickel oxide ($LiNiO_2$) in the lithium containing transition metal oxide to be used for the positive electrode active material of the nonaqueous electrolytic secondary battery has a feature of a high capacity and a drawback of a poor safety and a high overvoltage, it is inferior to the lithium cobalt oxide. Moreover, lithium manganese oxide ($LiMn_2O_4$) has a rich source and is inexpensive, and has a drawback; that an energy density is low and manganese itself is dissolved at a high temperature. Therefore, it is inferior to the lithium cobalt oxide. At the present time, accordingly, the use of the lithium cobalt oxide ($LiCoO_2$) to be the lithium containing transition metal oxide has been a mainstream.

However, it has been known that the lithium cobalt oxide is deteriorated by a charge and discharge. The degree of the deterioration is correlated with the crystallinity of the lithium cobalt oxide and is remarkable with a low crystallinity of the lithium cobalt oxide. Furthermore, if the crystallinity of the lithium cobalt oxide is low, lithium is removed from the lithium cobalt oxide during charging so that an unstable state is set and oxygen is apt to be desorbed from the lithium cobalt oxide. For this reason, there is a problem in that the lithium cobalt oxide having a low crystallinity is not sufficient in respect of a thermal stability, resulting in a poor safety.

SUMMARY OF THE INVENTION

It has been proposed that the physical properties of cobalt oxide to be the raw material of the lithium cobalt oxide or synthesis conditions such as a burning temperature are made proper to increase the crystallite size of the lithium cobalt oxide, thereby enhancing a crystallinity and improving a thermal stability. In order to eliminate a reduction in a discharge voltage with an increase in the crystallite size, furthermore, there has been proposed that a part of cobalt is substituted for a heterogeneous element such as V, Cr, Fe, Mn, Ni, Al or Ti. In the lithium cobalt oxide in which a part of cobalt is substituted for the heterogeneous element and the crystallite size is increased, oxygen is desorbed with difficulty during charging and the heterogeneous element is added so that an ion conducting property can be enhanced to raise a discharge voltage.

When the lithium cobalt oxide having a large crystallite size is used as an active material or lithium cobalt oxide obtained by substituting a part of cobalt of the active material for a heterogeneous element such as V, Cr, Fe, Mn, Ni, Al or Ti is used as an active material, however, there is a problem in that the amount of gas generated in a battery is increased in a high temperature atmosphere (approximately 60° C. to 100° C.) so that a cycle property is deteriorated, and furthermore, a deterioration in a battery property is increased due to the preservation of a battery in a charging state.

As a result of the detailed investigations of the physical properties of a positive electrode active material having a poor high temperature property by using an unused positive electrode active material, it has been found that a pH value of a filtrate taken by dispersing the positive electrode active material in water is increased in the positive electrode active material in which a cycle property is deteriorated at a high temperature, that is, the pH value of the filtrate of the positive electrode active material is correlated with the high temperature property.

From the result of such an experiment, the inventors had a knowledge that if the pH value of the filtrate of the positive electrode active material can be prevented from being increased, the generation of gas can be suppressed so that the cycle property can be enhanced at a high temperature and a deterioration can be suppressed during charging preservation.

The invention has been made based on such a knowledge and has an object to provide a nonaqueous electrolytic secondary battery in which such a positive electrode active material as not to increase the pH value of a filtrate to suppress the generation of the gas in the battery, thereby enhancing the cycle property at a high temperature and suppressing a deterioration during charging preservation.

In order to attain the object, an nonaqueous electrolytic secondary battery according to the invention uses, as a positive electrode active material, hexagonal system lithium containing cobalt composite oxide having a crystallite size in a (110) vector direction of 1000 Å or more and having a halogen compound added thereto by burning at time of synthesis. By measuring the pH value of a filtrate obtained by dispersing, in water, lithium containing cobalt composite oxide having a crystallite size in the (110) vector direction of 1000 Å or more to which the halogen compound is added by burning at time of synthesis, a value of 9.6 to 10.1 was obtained. Without the addition of the halogen, a pH value of 10 or more was obtained. Thus, it has been found that the pH value of the filtrate is reduced by adding the halogen compound. Furthermore, it has been found that a high temperature cycle property can be enhanced by using the lithium containing cobalt composite oxide as a positive electrode active material.

The details of the effect of an enhancement in the high temperature cycle property are not clear. As a result of the investigations of the battery after the repetition of a charge and discharge cycle, it could be confirmed that the amount of generation of the gas is reduced in the battery. It can be supposed that the halogen added to the lithium containing cobalt composite oxide by the burning at time of the synthesis is mainly present on the surface of the positive electrode active material, that is, the particle surface of the lithium containing cobalt composite oxide and the presence of the halogen suppresses the elution of lithium to reduce the pH value of the filtrate in dispersion water. Furthermore, it can be supposed that the particle surface of the lithium containing cobalt composite oxide is stabilized by the addition of the halogen at time of the synthesis so that the decomposed gas of an electrolyte is decreased, resulting in an enhancement in the high temperature cycle property.

In this case, if a content of the halogen to a mass of the positive electrode active material is less than 0.001% by mass, the pH value. of the filtrate having the positive electrode active material dispersed in the water is increased so that the high temperature cycle property is deteriorated. Moreover, if the content of the halogen to the mass of the positive electrode active material is more than 5.0% by mass, the amount of the addition of the lithium containing cobalt composite oxide itself is decreased so that a capacity is reduced. For this reason, it is desirable that the content of the halogen to the mass of the positive electrode active material should be 0.001% by mass to 5.0% by mass. Furthermore, it is desirable that the hexagonal system lithium containing cobalt composite oxide having a halogen compound added thereto by the burning at time of the synthesis should be lithium cobalt oxide to which the halogen compound is added.

Referring to lithium containing cobalt composite oxide having a part of cobalt substituted for a heterogeneous element such as V, Cr, Fe, Mn, Ni, Al or Ti, it has been found that a filtrate having the lithium containing cobalt composite oxide dispersed in water has a pH value increased. Such cobalt composite oxide has a heterogeneous element added thereto so that an ion conducting property can be enhanced to gain an excellent discharge property.

Accordingly, when halogen is contained to be used as a positive electrode active material at time of the synthesis of lithium cobalt oxide having a part of cobalt substituted for at least one kind of heterogeneous element selected from V, Cr, Fe, Mn, Ni, Al and Ti and a molar ratio of the heterogeneous element to the cobalt of 0.0001 to 0.005, it is possible to obtain a nonaqueous electrolytic secondary battery in which a high temperature cycle property is enhanced without damaging an excellent discharge property. Fluorine is desirable for the halogen to be contained at time of the synthesis of the lithium containing cobalt composite oxide.

In order to obtain the positive electrode active material, preferably, there are provided the steps of mixing a first component having a lithium compound, a second component having a cobalt compound, and a third component having a halogen compound to obtain a 3-component mixture and burning the 3-component mixture to have a crystallite size in a (110) vector direction of 1000 Å or more.

Alternatively, there are preferably provided the steps of mixing a lithium compound, a cobalt compound substituted for at least one kind of heterogeneous element selected from V, Cr, Fe, Mn, Ni, Al and Ti, and a halogen compound to obtain a 3-component mixture and burning the 3-component mixture to have a crystallite size in a (110) vector direction of 1000 Å or more.

In this case, it is also possible to use a 4-compound mixture including a lithium compound, a cobalt compound, a compound such as oxide containing at least one kind of element selected from V, Cr, Fe, Mn, Ni, Al and Ti and a halogen compound in place of the 3-component mixture.

Since the invention provides a nonaqueous electrolytic secondary battery in which a thermal stability is excellent and a safety is high, and a cycle property is enhanced at a high temperature and a deterioration is suppressed during charging preservation, there is a feature in that a specific positive electrode active material is used. For a negative electrode material, a separator material, a nonaqueous electrolytic material and a binder material, therefore, it is possible to use a well-known material.

BRIEF DESCRIPTION OF THE DRAWINGS

FIG. 1 shows the results of measurement of pH value of positive electrode active material in this invention.

FIG. 2 shows the results of thermal analysis of charged positive electrode in this invention.

FIG. 3 shows the results of measurement of pH value of positive electrode active material from investigation of lithium cobalt oxide substituted for heterogeneous element in this invention.

FIG. 4 shows the results of thermal analysis of charged positive electrode from investigation of lithium cobalt oxide substituted for heterogeneous element in this invention.

DESCRIPTION OF THE PREFERRED EMBODIMENTS

Next, an embodiment of the invention will be described below.

1. Formation of Positive Electrode Active Material (1) EXAMPLE 1

First of all, lithium carbonate ($Li_2CO_3$) was prepared as a starting material of a lithium source and tricobalt tetraoxide ($Co_3O_4$) having a specific surface area of 8.3 $m^2/g$ was prepared as a starting material of a cobalt source, and they were then weighed such that a molar ratio of lithium to cobalt is 1:1, and furthermore, lithium fluoride (LiF) was added and mixed as a starting material of a halogen source. Subsequently, a mixture thus obtained was baked in the air (in this case, a burning temperature (for example, 980° C.) and a burning time (for example, 24 hours) were regulated such that a crystallite size in a (110) vector direction of a baked product thus obtained is 1000 Å or more). Thus, a baked product of fluorine containing lithium cobalt oxide ($LiCoO_2$) was synthesized.

Then, the baked product thus synthesized was ground to have an average particle size of 10 μm so that a positive electrode active material al according to an example 1 was obtained. The positive electrode active material al thus obtained was analyzed by ion chromatography so that a content of the fluorine to a mass of the positive electrode active material was 0.05% by mass. The fluorine containing positive electrode active material al thus obtained was measured by XRD (X-Ray Diffraction) and was found to be hexagonal system lithium cobalt oxide ($LiCoO_2$). By calculating a crystallite size using a Scheller expression, a crystallite size in the (110) vector direction was 1045 Å.

(2) EXAMPLE 2

A fluorine containing positive electrode active material was formed in the same manner as in the example 1 except that lithium fluoride (LiF) was used as a starting material of a halogen source and was added to have a content of fluorine in 0.0007% by mass with respect to a mass of a positive electrode active material. Thus, a positive electrode active material b1 according to an example 2 was obtained. The fluorine containing positive electrode active material b1 thus obtained was hexagonal system lithium cobalt oxide ($LiCoO_2$) and a crystallite size in a (110) vector direction was 1030 Å.

(3) EXAMPLE 3

A fluorine containing positive electrode active material was formed in the same manner as in the example 1 except that lithium fluoride (LiF) was used as a starting material of a halogen source and was added to have a content of fluorine in 0.001% by mass with respect to a mass of a positive electrode active material. Thus, a positive electrode active material c1 according to an example 3 was obtained. The fluorine containing positive electrode active material c1 thus obtained was hexagonal system lithium cobalt oxide ($LiCoO_2$) and a crystallite size in a (110) vector direction was 1050 Å.

(4) EXAMPLE 4

A fluorine containing positive electrode active material was formed in the same manner as in the example 1 except that lithium fluoride (LiF) was used as a starting material of a halogen source and was added to have a content of fluorine in 5.0% by mass with respect to a mass of a positive electrode active material. Thus, a positive electrode active material d1 according to an example 4 was obtained. The fluorine containing positive electrode active material d1 thus obtained was hexagonal system lithium cobalt oxide ($LiCoO_2$) and a crystallite size in a (110) vector direction was 1048 Å.

(5) EXAMPLE 5

A fluorine containing positive electrode active material was formed in the same manner as in the example 1 except that lithium fluoride (LiF) was used as a starting material of a halogen source and was added to have a content of fluorine in 7.0% by mass with respect to a mass of a positive electrode active material. Thus, a positive electrode active material e1 according to an example 5 was obtained. The fluorine containing positive electrode active material e1 thus obtained was hexagonal system lithium cobalt oxide ($LiCoO_2$) and a crystallite size in a (110) vector direction was 1053 Å.

(6) EXAMPLE 6

A fluorine containing positive electrode active material was formed in the same manner as in the example 1 except that lithium fluoride (LiF) was used as a starting material of a halogen source and was added to have a content of fluorine in 0.01% by mass with respect to a mass of a positive electrode active material. Thus, a positive electrode active material f1 according to an example 6 was obtained. The fluorine containing positive electrode active material f1 thus obtained was hexagonal system lithium cobalt oxide ($LiCoO_2$) and a crystallite size in a (110) vector direction was 1045 Å.

(7) EXAMPLE 7

A fluorine containing positive electrode active material was formed in the same manner as in the example 1 except that lithium fluoride (LiF) was used as a starting material of a halogen source and was added to have a content of fluorine in 0.3% by mass with respect to a mass of a positive electrode active material. Thus, a positive electrode active material g1 according to an example 7 was obtained. The fluorine containing positive electrode active material g1 thus obtained was hexagonal system lithium cobalt oxide ($LiCoO_2$) and a crystallite size in a (110) vector direction was 1050 Å.

(8) EXAMPLE 8

A fluorine containing positive electrode active material was formed in the same manner as in the example 1 except that lithium fluoride (LiF) was used as a starting material of a halogen source and was added to have a content of fluorine in 0.5% by mass with respect to a mass of a positive electrode active material. Thus, a positive electrode active material h1 according to an example 8 was obtained. The fluorine containing positive electrode active material h1 thus obtained was hexagonal system lithium cobalt oxide ($LiCoO_2$) and a crystallite size in a (110) vector direction was 1052 Å.

(9) COMPARATIVE EXAMPLE 1

A positive electrode active material was formed in the same manner as in the example 1 except that a halogen compound was not used. Thus, a positive electrode active material s1 according to a comparative example 1 was obtained. The positive electrode active material s1 thus obtained was hexagonal system lithium cobalt oxide ($LiCoO_2$) and a crystallite size in a (110) vector direction was 1042 Å.

(10) COMPARATIVE EXAMPLE 2

A fluorine containing positive electrode active material was formed in the same manner as in the example 1 except that tricobalt tetraoxide ($Co_3O_4$) having a specific surface area of 0.9 $m^2/g$ was used for a starting material of a cobalt source. Thus, a positive electrode active material t1 according to a comparative example 2 was obtained. The fluoride containing positive electrode active material t1 thus obtained was hexagonal system lithium cobalt oxide ($LiCoO_2$) and a crystallite size in a (110) vector direction was 700 Å.

(11) REFERENCE EXAMPLE 1

First of all, lithium carbonate ($Li_2CO_3$) to be a starting material of a lithium source and tricobalt tetraoxide ($Co_3O_4$) having a specific surface area of 0.9 $m^2/g$ to be a starting material of a cobalt source were prepared, and were then weighed and mixed such that a molar ratio (Li/Co) of a lithium (Li) component of the lithium carbonate ($Li_2CO_3$) to a cobalt (Co) component of the tricobalt tetraoxide ($Co_3O_4$) is 1. A mixture thus obtained was baked in the same manner as in the example 1 and a baked product of $LiCoO_2$ was synthesized. The baked product thus synthesized was ground to have an average particle size of 10 μm so that a positive electrode active material u1 according to a reference example 1 was obtained. The positive electrode active material u1 thus obtained was hexagonal system cobalt composite oxide ($LiCoO_2$) and a crystallite size in a (110) vector direction was 690 Å.

2. Measurement of pH Value of Positive Electrode Active Material

Then, each of the positive electrode active materials a1, b1, c1, d1, e1, f1, g1, h1, s1, t1 and u1 formed as described above was prepared in a weight of 2 g and was put in a 200 ml beaker filled with ion-exchange water of 150 ml. Thereafter, a stirring bar was put in the beaker and the beaker was sealed with a film, and stirring was then carried out for 30 minutes. Subsequently, each solution thus stirred was sucked and filtered through a membrane filter (manufactured by PTFE and having a pore size of 0.1 μm) and a filtrate was then measured by a pH meter comprising an ISFET (Ion-Selective Field Effect Transistor: a field effect transistor comprising a gate electrode having a sensitivity for a certain kind of ion in an electrolyte). Consequently, results shown in the following FIG. 1 were obtained.

From the results of the FIG. 1, the following is apparent. By a comparison of the positive electrode active material u1 having a crystallite size of 690 Å according to the reference example 1 with the positive electrode active material s1 having a crystallite size of 1042 Å according to the comparative example 1, it is apparent that the positive electrode active material according to the reference example 1 has a pH value more reduced. This implies that the pH value is increased when the crystallite size of lithium cobalt oxide ($LiCoO_2$) is increased. By a comparison of the positive electrode active materials a1, b1, c1, d1, e1, f1, g1 and h1 having a crystallite size of 1000 Å or more according to the examples with the positive electrode active material s1 according to the comparative example 1, moreover, it is apparent that the positive electrode active materials a1, b1, c1, d1, e1, f1, g1 and h1 according to the examples have pH values more reduced. This implies that the pH value is reduced when fluorine is added during the burning of the lithium cobalt oxide ($LiCoO_2$).

3. Fabrication of Positive Electrode

Subsequently, the positive electrode active materials a1, b1, c1, d1, e1, f1, g1, h1, s1, t1 and u1 formed as described above were used and 85 parts by mass of each positive electrode active material, 10 parts by mass of carbon powder to be a conducting agent and 5 parts by mass of polyfluorovinylidene (PVdF) powder to be a binder were mixed to prepare a positive electrode mixture. Then, the positive electrode mixture thus obtained was mixed with N-methyl pyrrolidone (NMP) to prepare a positive electrode slurry. Thereafter, the positive electrode slurry was applied to both surfaces of a positive electrode collector having a thickness of 20 μm (an aluminum foil or an aluminum alloy foil) by a doctor blade method, thereby forming an active material layer on both surfaces of the positive electrode collector. The active material layer was dried, and was then rolled to have a predetermined thickness (for example, 170 μm) by using a compression roll and was cut to have a predetermined dimension (for example, a width of 55 mm and a length of 500 mm). Thus, positive electrodes a, b, c, d, e, f, g, h, s, t and u were fabricated, respectively.

The positive electrode active material a1 was used to form the positive electrode a, the positive electrode active material b1 was used to form the positive electrode b, the positive electrode active material c1 was used to form the positive electrode c, the positive electrode active material d1 was used to form the positive electrode d, the positive electrode active material e1 was used to form the positive electrode e, the positive electrode active material f1 was used to form the positive electrode f, the positive electrode active material g1 was used to form the positive electrode g, the positive electrode active material h1 was used to form the positive electrode h, the positive electrode active material s1 was used to form the positive electrode s, the positive electrode active material t1 was used to form the positive electrode t, and the positive electrode active material u1 was used to form the positive electrode u.

4. Fabrication of Negative Electrode 95 parts by mass of natural graphite powder and 5 parts by mass of polyfluorovinylidene (PVDF) powder to be a binder were mixed and they were then mixed with N-methyl pyrrolidone (NMP) to prepare a negative electrode slurry. Thereafter, the negative electrode slurry thus obtained was applied to both surfaces of a negative electrode collector (copper foil) having a thickness of 18 μm by a doctor blade method, thereby forming an active material layer on both surfaces of the negative electrode collector. The active material layer was dried, and was then rolled to have a predetermined thickness (for example, 155 μm) by using a compression roll and was cut to have a predetermined dimension (for example, a width of 57 mm and a length of 550 mm). Thus, a negative electrode was fabricated.

5. Fabrication of Nonaqueous Electrolytic Secondary Battery

Subsequently, the positive electrodes a, b, c, d, e, f, g, h, s, t and u fabricated as described above and the negative electrode fabricated as described above were used respectively to interpose a separator comprising a fine porous film formed of polypropylene, and they were then wound spirally to form a spiral electrode group. They were inserted into cylindrical casing respectively and a collecting tab extended from each collector was welded to each terminal, and a nonaqueous electrolyte having 1 mol/liter of $LiPF_6$ dissolved therein was injected into an equivolume mixed solvent of ethylene carbonate (EC) and diethyl carbonate (DEC).

Then, a positive electrode cover was attached to an opening of the armoring can to be sealed, thereby fabricating a nonaqueous electrolytic secondary battery having a typical capacity of 1500 mAh. The positive electrode a was used to form a battery A, the positive electrode b was used to form a battery B, the positive electrode c was used to form a battery C, the positive electrode d was used to form a battery D, the positive electrode e was used to form a battery E, the positive electrode f was used to form a battery F, the positive electrode g was used to form a battery G, and the positive electrode h was used to form a battery H. Moreover, the positive electrode s was used to form a battery S, the positive electrode t was used to form a battery T and the positive electrode u was used to form a battery U.

6. Measurement of High Temperature Cycle Property

Subsequently, the batteries A to H and S to U were used to carry out a charge with a constant charge current of 1500 mA (1 It: It is a numerical value represented by a typical capacity (mA)/1 h (time)) at 60° C. until a battery voltage of 4.2 V could be obtained and to carry out the charge with a constant battery voltage of 4.2 V until a final current of 30 mA could be obtained. Thereafter, a charge and discharge was carried out once such that the discharge was performed to obtain a battery voltage of 2.75 V with a discharge current of 1500 mA (1 It), thereby calculating a discharge capacity (an initial capacity) after one cycle since a deintercalating time. Consequently, results shown in the following FIG. 2 were obtained.

Moreover, such a charge and discharge cycle was repeated 300 times and a discharge capacity was obtained after the 300 cycles. Subsequently, a discharge capacity obtained after the 300 cycles for a discharge capacity after one cycle was calculated as a capacity retention rate (capacity retention rate (%)=(discharge capacity after 300 cycles/discharge capacity after 1 cycle)×100) so that the results shown in the following FIG. 2 were obtained. Furthermore, an average discharge voltage for a first cycle was obtained as shown in the following FIG. 2.

7. Thermal Analysis of Charged Positive Electrode

Subsequently, the batteries A to H and S to U were charged with a constant charge current of 1500 mA (1 It) at 25° C. to obtain a battery voltage of 4.2 V and were then charged with a constant battery voltage of 4.2 V to obtain a final current of 30 mA. Thereafter, each battery was decomposed in a dry box to take out a positive electrode, and the positive electrode was washed with dimethyl carbonate and was vacuum dried so that a test piece was obtained. By putting the test pieces in a thermogravimetry (TG) apparatus to raise a temperature from a room temperature (approximately 25° C.) to 300° C. at a temperature rising speed of 5° C./min, a mass of each test piece before the temperature rise and a mass of each test piece after the temperature rise were measured and a mass decrease rate (TG mass decrease rate (%)) was obtained from the results of the measurement. Thus, the results shown in the following FIG. 2 were obtained.

The decrease in the mass was caused by the desorption of oxygen in the positive electrode active material from the positive electrode active material with the rise in the temperature. In the case in which the amount of the desorption of the oxygen (the amount of the decrease in the mass) is large, a thermal stability is low. In the case in which the positive electrode active material is used as an active material for a battery, a safety for a heat test in a charging state is deteriorated.

As is apparent from the results of the FIG. 2, an excellent high temperature cycle property is obtained, in which the high temperature capacity retention rate after 300 cycles of the battery S using a positive electrode active material having no lithium fluoride added thereto was reduced to 63%, while the high temperature capacity retention rates of the batteries A, B, C, D, E, F, G and H using a positive electrode active material having the lithium fluoride added thereto exceeds 80%. As a result of the investigations of each battery after the cycle property test, it was found that a large amount of gas is generated in the battery S.

By a comparison of the battery T using a positive electrode active material having a crystallite size in a (110) vector direction of approximately 700 Å with the battery U, moreover, it was found that the high temperature retention rate after 300 cycles is low, for example, 76% or 75% irrespective of the addition of the lithium fluoride, while the amounts of generation of the gas from the batteries T and U are small.

By a comparison of the battery T using a positive electrode active material having a content of fluorine equal to 0.05% by mass and a crystallite size in a (110) vector direction of 700 Å with the battery A using a positive electrode active material having a crystallite size in the (110) vector direction of 1045 Å, furthermore, it is apparent that the high temperature capacity retention rate of the battery A is more enhanced.

Moreover, it is apparent that the batteries A, B, C, D, E, F, G, H and S using a positive electrode active material having a crystallite size in a (110) vector direction of 1000 Å or more have smaller TG mass decreases than those of the batteries T and U using a positive electrode active material having a crystallite size in the (110) vector direction of approximately 700 Å.

In consideration of the foregoing, it is preferable that a positive electrode active material having a crystallite size in the (110) vector direction of 1000 Å or more and having lithium fluoride added thereto should be used because a battery having an excellent high temperature capacity retention rate, a small TG mass decrease and a great thermal stability can be obtained.

There was investigated the content of fluorine in a battery using a positive electrode active material having a crystallite size in the (110) vector direction of 1000 Å or more and having the lithium fluoride added thereto. It is apparent that the high temperature capacity retention rate is reduced by using a positive electrode active material having the lithium fluoride added thereto such that the content of the fluorine is 0.0007% by mass as in the battery B. The reason is that a degree of a decrease in the pH value is reduced due to a decrease in the content of the fluorine, resulting in an increase in a deterioration in the high temperature cycle property.

On the other hand, it is apparent that the initial capacity and the high temperature capacity retention rate are reduced when a positive electrode active material having the lithium fluoride added thereto is used such that the content of fluorine is 7.0% by mass as in the battery E. It can be supposed that lithium cobalt oxide to be used for a charge and discharge is relatively decreased if the content of the fluorine is increased.

On the contrary, it is apparent that the initial capacity and the high temperature capacity retention rate are more enhanced with the use of a positive electrode active material having the lithium fluoride added thereto by burning at time of synthesis such that the content of the fluorine is 0.001 to 5.0% by mass as in the batteries A, C, D, F, G and H.

From the foregoing, it is preferable that the lithium fluoride should be added to the lithium cobalt oxide to have a content of the fluorine of 0.001 to 5.0% by mass and should be baked to have a crystallite size in a (110) vector direction of 1000 Å or more. Apparently, it is more preferable that an average discharge voltage and a high temperature cycle capacity retention rate can be more enhanced by adding the lithium fluoride to have a content of the fluorine of 0.01 to 0.3% by mass and burning them to have a crystallite size in the (110) vector direction of 1000 Å or more.

8. Investigation of Lithium Cobalt Oxide substituted for Heterogeneous Element

Subsequently, investigations were given to a high temperature cycle property in the case in which a heterogeneous element was added to lithium cobalt oxide and a part of cobalt was substituted for the heterogeneous element.

(1) EXAMPLE 9

First of all, lithium carbonate ($Li_2CO_3$) was prepared as a starting material of a lithium source and tricobalt tetraoxide ($Co_{0.999}Ti_{0.001})_3O_4$ substituted for titanium (Ti) to be a heterogeneous element (a content of titanium was 0.999:0.001 in a molar ratio of cobalt to titanium) was prepared as a starting material of a cobalt source, and furthermore, lithium fluoride (LiF) was prepared as a starting material of a halogen source. The tricobalt tetraoxide ($Co_{0.999}Ti_{0.001})_3O_4$ substituted for the titanium (Ti) was obtained by precipitating, as composite hydroxide, cobalt and titanium which are dissolved in an acid solution and calcining them at 300° C.

Then, weighing and mixing were carried out such that a molar ratio (Li/Co+Ti) of a lithium (Li) component of lithium carbonate ($Li_2CO_3$) to a sum (Co+Ti) of a cobalt component and a titanium component in the tricobalt tetraoxide ($Co_{0.999}Ti_{0.001})_3O_4$ having a part of cobalt substituted for titanium (Ti) was 1, and lithium fluoride (LiF) was added and mixed with them such that a content of fluorine was 0.05% by mass with respect to the mass of a positive electrode active material.

Subsequently, a mixture thus obtained was baked in the same manner as in the example 1 (also in this case, a burning temperature and a burning time were regulated such that a crystallite size in a (110) vector direction of a baked product thus obtained was 1000 Å or more) and was ground to have an average particle size of 10 μm so that a positive electrode active material i1 according to an example 9 was obtained. The positive electrode active material i1 containing fluorine thus obtained was hexagonal system lithium cobalt oxide ($LiCo_{0.999}Ti_{0.001}O_2$) having a part of cobalt substituted for titanium and a crystallite size in a (110) vector direction was 1050 Å.

(2) EXAMPLE 10

A mixture was obtained in the same manner as in the example 9 except that lithium chloride (LiCl) was used as a starting material of a halogen source to have a content of chlorine of 0.05% by mass, and was then baked in the same manner as in the example 9 to synthesize lithium cobalt oxide ($LiCo_{0.999}Ti_{0.001}O_2$) containing chlorine and having a part of cobalt substituted for titanium. The mixture was ground to have an average particle size of 10 μm so that a positive electrode active material j1 according to an example 10 was obtained. The positive electrode active material j1 containing chlorine thus obtained was hexagonal system lithium cobalt oxide ($LiCo_{0.999}Ti_{0.001}O_2$) having a part of cobalt substituted for titanium and a crystallite size in a (110) vector direction was 1047 Å.

(3) EXAMPLE 11

A mixture was obtained in the same manner as in the example 9 except that tricobalt tetraoxide ($Co_{0.995}Ti_{0.005})_3O_4$ substituted for titanium to have a content of titanium in a molar ratio of cobalt to titanium of 0.995:0.005 was used as a starting material of a cobalt source and lithium fluoride (LiF) was used as a starting material of a halogen source to have a content of fluorine of 0.05% by mass, and was then baked in the same manner as in the example 9 to synthesize lithium cobalt oxide ($LiCo_{0.995}Ti_{0.005}O_2$) containing fluorine and having a part of cobalt substituted for titanium. The mixture was ground to have an average particle size of 10 μm so that a positive electrode active material k1 according to an example 11 was obtained. The positive electrode active material k1 containing chlorine thus obtained was hexagonal system lithium cobalt oxide ($LiCo_{0.995}Ti_{0.005}O_2$) having a part of cobalt substituted for titanium and a crystallite size in a (110) vector direction was 1032 Å.

(4) EXAMPLE 12

A mixture was obtained in the same manner as in the example 9 except that lithium fluoride (LiF) was used as a starting material of a halogen source to have a content of fluorine of 0.0007% by mass, and was then baked in the same manner as in the example 9 to synthesize lithium cobalt oxide ($LiCo_{0.999}Ti_{0.001}O_2$) containing fluorine and having a part of cobalt substituted for titanium. The mixture was ground to have an average particle size of 10 μm so that a positive electrode active material l1 according to an example 12 was obtained. The positive electrode active material l1 containing chlorine thus obtained was hexagonal system lithium cobalt oxide ($LiCo_{0.999}Ti_{0.001}O_2$) having a part of cobalt substituted for titanium and a crystallite size in a (110) vector direction was 1052 Å.

(5) EXAMPLE 13

A mixture was obtained in the same manner as in the example 9 except that lithium fluoride (LiF) was used as a starting material of a halogen source to have a content of fluorine of 0.001% by mass, and was then baked in the same manner as in the example 9 to synthesize lithium cobalt oxide ($LiCo_{0.999}Ti_{0.001}O_2$) containing fluorine and having a part of cobalt substituted for titanium. The mixture was ground to have an average particle size of 10 μm so that a positive electrode active material m1 according to an example 13 was obtained. The positive electrode active material m1 containing chlorine thus obtained was lithium cobalt oxide ($LiCo_{0.999}Ti_{0.001}O_2$) containing hexagonal system fluorine and having a part of cobalt substituted for titanium and a crystallite size in a (110) vector direction was 1051 Å.

(6) EXAMPLE 14

A mixture was obtained in the same manner as in the example 9 except that lithium fluoride (LiF) was used as a starting material of a halogen source to have a content of fluorine of 5.0% by mass, and was then baked in the same manner as in the example 9 to synthesize lithium cobalt oxide ($LiCo_{0.999}Ti_{0.001}O_2$) containing fluorine and having a part of cobalt substituted for titanium. The mixture was ground to have an average particle size of 10 μm so that a positive electrode active material n1 according to an example 14 was obtained. The positive electrode active material n1 containing fluorine thus obtained was hexagonal system lithium cobalt oxide ($LiCo_{0.999}Ti_{0.001}O_2$) having a part of cobalt substituted for titanium and a crystallite size in a (110) vector direction was 1040 Å.

(7) EXAMPLE 15

A mixture was obtained in the same manner as in the example 9 except that lithium fluoride (LiF) was used as a starting material of a halogen source to have a content of fluorine of 7.0% by mass, and was then baked in the same manner as in the example 9 to synthesize lithium cobalt oxide ($LiCo_{0.999}Ti_{0.001}O_2$) containing fluorine and having a part of cobalt substituted for titanium. The mixture was ground to have an average particle size of 10 μm so that a positive electrode active material o1 according to an example 15 was obtained. The positive electrode active material o1 containing fluorine thus obtained was hexagonal system lithium cobalt oxide ($LiCo_{0.999}Ti_{0.001}O_2$) having a part of cobalt substituted for titanium and a crystallite size in a (110) vector direction was 1042 Å.

(8) EXAMPLE 16

A mixture was obtained in the same manner as in the example 9 except that lithium fluoride (LiF) was used as a starting material of a halogen source to have a content of fluorine of 0.01% by mass, and was then baked in the same manner as in the example 9 to synthesize lithium cobalt oxide ($LiCo_{0.999}Ti_{0.001}O_2$) containing fluorine and having a part of cobalt substituted for titanium. The mixture was ground to have an average particle size of 10 μm so that a positive electrode active material p1 according to an example 16 was obtained. The positive electrode active material p1 containing chlorine thus obtained was hexagonal system lithium cobalt oxide ($LiCo_{0.999}Ti_{0.001}O_2$) having a part of cobalt substituted for titanium and a crystallite size in a (110) vector direction was 1048 Å.

(9) EXAMPLE 17

A mixture was obtained in the same manner as in the example 9 except that lithium fluoride (LiF) was used as a starting material of a halogen source to have a content of fluorine of 0.3% by mass, and was then baked in the same manner as in the example 9 to synthesize lithium cobalt oxide ($LiCo_{0.999}Ti_{0.001}O_2$) containing fluorine and having a part of cobalt substituted for titanium. The mixture was ground to have an average particle size of 10 μm so that a positive electrode active material q1 according to an example 17 was obtained. The positive electrode active material q1 containing fluorine thus obtained was hexagonal system lithium cobalt oxide (LiCo$_{0.999}$Ti$_{0.001}$O$_2$) having a part of cobalt substituted for titanium and a crystallite size in a (110) vector direction was 1047 Å.

(10) EXAMPLE 18

A mixture was obtained in the same manner as in the example 9 except that lithium fluoride (LiF) was used as a starting material of a halogen source to have a content of fluorine of 0.5% by mass, and was then baked in the same manner as in the example 9 to synthesize lithium cobalt oxide (LiCo$_{0.999}$Ti$_{0.001}$O$_2$) containing fluorine and having a part of cobalt substituted for titanium. The mixture was ground to have an average particle size of 10 μm so that a positive electrode active material r1 according to an example 18 was obtained. The positive electrode active material r1 containing fluorine thus obtained was hexagonal system lithium cobalt oxide (LiCo$_{0.999}$Ti$_{0.001}$O$_2$) having a part of cobalt substituted for titanium and a crystallite size in a (110) vector direction was 1043 Å.

(11) COMPARATIVE EXAMPLE 3

A mixture was obtained in the same manner as in the example 9 except that a halogen compound was not used, and was then baked in the same manner as in the example 9 to synthesize lithium cobalt oxide (LiCo$_{0.999}$Ti$_{0.001}$O$_2$) having a part of cobalt substituted for titanium. The mixture was ground to have an average particle size of 10 μm so that a positive electrode active material v1 according to a comparative example 3 was obtained. The positive electrode active material v1 thus obtained was hexagonal system cobalt composite oxide (LiCo$_{0.999}$Ti$_{0.001}$O$_2$) having a part of cobalt substituted for titanium and a crystallite size in a (110) vector direction was 1030 Å.

(12) COMPARATIVE EXAMPLE 4

A mixture was obtained in the same manner as in the example 9 except that tricobalt tetraoxide (Co$_{0.995}$Ti$_{0.005}$)$_3$O$_4$ substituted for titanium to have a content of titanium in a molar ratio of cobalt to titanium of 0.995:0.005 was used as a starting material of a cobalt source and a halogen compound was not used, and was then baked in the same manner as in the example 9 to synthesize lithium cobalt oxide (LiCo$_{0.995}$Ti$_{0.005}$O$_2$) having a part of cobalt substituted for titanium. The mixture was ground to have an average particle size of 10 μm so that a positive electrode active material w1 according to a comparative example 4 was obtained. The positive electrode active material w1 thus obtained was hexagonal system cobalt composite oxide (LiCo$_{0.995}$Ti$_{0.005}$O$_2$) having a part of cobalt substituted for titanium and a crystallite size in a (110) vector direction was 1010 Å.

(13) COMPARATIVE EXAMPLE 5

Lithium carbonate (Li$_2$CO$_3$) to be a starting material of a lithium source, manganese dioxide (MnO$_2$) to be a starting material of a manganese source and chromium oxide (Cr$_2$O$_3$) to be a chromium source were prepared respectively, and were then weighed and mixed such that a molar ratio of lithium, manganese and chromium was 1.04:1.86:0.1, and furthermore, lithium fluoride (LiF) was added and mixed with them to have a content of fluorine of 0.05% by mass.

Subsequently, a mixture thus obtained was baked in the air for 20 hours at 800° C. to synthesize a baked product of Li$_{1.04}$Mn$_{1.86}$Cr$_{0.1}$O$_4$. Then, the baked product thus synthesized was ground to have an average particle size of 10 μm. Consequently, a positive electrode active material x1 according to a comparative example 5 was obtained. The positive electrode active material x1 containing fluorine thus obtained was manganese composite oxide having a spinel structure.

(14) COMPARATIVE EXAMPLE 6

A mixture was obtained in the same manner as in the example 9 except that a halogen compound was not used, and was then baked in the same manner as in the example 9 to synthesize a baked product of lithium cobalt oxide (LiCo$_{0.999}$Ti$_{0.001}$O$_2$) having a part of cobalt substituted for titanium. Subsequently, 5.0% by mass of lithium fluoride (LiF) was added to the baked product thus synthesized and was then heat treated for five hours at 350° C., and LiCo$_{0.999}$Ti$_{0.001}$O$_2$ was caused to contain fluorine and was ground to have an average particle size of 10 μm so that a positive electrode active material y1 according to a comparative example 6 was obtained. The positive electrode active material y1 containing fluorine thus obtained was hexagonal system cobalt composite oxide (LiCo$_{0.999}$Ti$_{0.001}$O$_2$) having a part of cobalt substituted for titanium and a crystallite size in a (110) vector direction was 1040 Å.

(15) REFERENCE EXAMPLE 2

A baked product of Li$_{1.04}$Mn$_{1.86}$Cr$_{0.1}$O$_4$ was synthesized in the same manner as in the comparative example 5 except that lithium fluoride was not added at time of synthesis. Then, the baked product thus synthesized was ground to have an average particle size of 10 μm so that a positive active material z1 according to a reference example 2 was obtained. The positive electrode active material z1 thus obtained was manganese composite oxide having a spinel structure.

By using the positive electrode active materials i1 to r1 and v1 to z1 fabricated as described above, subsequently, the pH values of the positive electrode active materials were measured in the same manner as described above. Consequently, results shown in the following FIG. 3 were obtained.

The following is apparent from the results of the FIG. 3. More specifically, it is apparent that the positive electrode active materials v1 and w1 according to the comparative examples 3 and 4 which have a part of cobalt substituted for Ti to be a heterogeneous element have pH values more increased than those of the positive electrode active material s1 (see the FIG. 1) according to the comparative example 1. This implies that the pH value is increased if a part of cobalt of lithium cobalt oxide (LiCoO$_2$) is substituted for a heterogeneous element.

By a comparison of the positive electrode active material y1 according to the comparative example 6 to which fluorine is added after the lithium cobalt oxide (LiCo$_{0.999}$Ti$_{0.001}$O$_2$) substituted for Ti to be the heterogeneous element is synthesized with the positive electrode active material i1 according to the example 9 which contains the fluorine at time of the synthesis, moreover, it is apparent that the positive electrode active material i1 has a smaller pH value. The reason is that the state of presence of the fluorine is changed when the fluorine is added after the synthesis. This implies that the pH value is more reduced by the addition of the fluorine at time of the synthesis of the lithium cobalt oxide (LiCo$_{0.999}$Ti$_{0.001}$O$_2$) having a part of cobalt substituted for titanium than the addition of the fluorine after the synthesis of the lithium cobalt oxide (LiCo$_{0.999}$Ti$_{0.001}$O$_2$) having a part of cobalt substituted for titanium.

It is apparent that the positive electrode active material x1 according to the comparative example 5 which is obtained by adding lithium fluoride to spinel type lithium manganese oxide ($Li_{1.04}Mn_{1.86}Cr_{0.1}O_4$) substituted for Cr to be a heterogeneous element has a pH value which is equal to the pH value of the positive electrode active material z1 according to the reference example 2 having no fluorine added thereto and is not reduced even if the fluorine is added. Accordingly, it is supposed that the spinel type lithium manganese oxide and the lithium cobalt oxide have different effects of containing the fluorine.

By using the positive electrode active materials, subsequently, a positive electrode i (using the positive electrode active material i1), a positive electrode j (using the positive electrode active material j1), a positive electrode k (using a positive electrode active material k1), a positive electrode l (using a positive electrode active material l1), a positive electrode m (using a positive electrode active material m1), a positive electrode n (using a positive electrode active material n1), a positive electrode o (using a positive electrode active material o1), a positive electrode p (using a positive electrode active material p1), a positive electrode q (using a positive electrode active material q1) and a positive electrode r (using a positive electrode active material r1) were fabricated respectively in the same manner as described above. Moreover, a positive electrode v (using the positive electrode active material v1), a positive electrode w (using the positive electrode active material w1), a positive electrode x (using the positive electrode active material x1), a positive electrode y (using the positive electrode active material y1) and a positive electrode z (using the positive electrode active material z1) were fabricated, respectively.

By using the positive electrodes, then, nonaqueous electrolytic secondary batteries I (using the positive electrode i), J (using the positive electrode j), K (using the positive electrode k), L (using the positive electrode l), M (using the positive electrode m), N (using the positive electrode n), O (using the positive electrode o), P (using the positive electrode p), Q (using the positive electrode q), R (using the positive electrode r), V (using the positive electrode v), W (using the positive electrode w), X (using the positive electrode x), Y (using the positive electrode y) and Z (using the positive electrode z) were fabricated respectively in the same manner as described above. By using the batteries I to R and V to Z, thereafter, a discharge capacity (an initial capacity) after one cycle, a capacity retention rate after 300 cycles, an average discharge voltage for a first cycle and a TG mass decrease rate were calculated in the same manner as described above so that results shown in the following FIG. 4 were obtained.

As is apparent from the results of the FIG. 4, an excellent high temperature cycle property can be obtained, in which the high temperature capacity retention rates after 300 cycles of the batteries V, W, X and Z using the positive electrode active material having a part of cobalt substituted for Ti to be a heterogeneous element and having no lithium fluoride added thereto were greatly reduced at the level of 50%, while the high temperature capacity retention rates of the batteries I, J, K, L, M, N, O, P, Q and R using the positive electrode active material having a part of cobalt substituted for Ti to be a heterogeneous element and having lithium fluoride or lithium chloride added thereto are more than 80%.

Moreover, it is apparent that the batteries I, J, K, L, M, N, O, P, Q and R using the positive electrode active material having a part of cobalt substituted for Ti to be a heterogeneous element have higher average discharge voltages than those of the batteries A, B, C, D, E, F, G and H (see the FIG. 2) using a positive electrode active material which is not substituted for a heterogeneous element. The reason is that a part of cobalt is substituted for the heterogeneous element, resulting in an enhancement in the ion conducting property of the positive electrode active material.

Consequently, a part of cobalt is substituted for the heterogeneous element and a halogen compound such as lithium fluoride or lithium chloride is added. Thus, it is possible to obtain a nonaqueous electrolytic secondary battery which is excellent in an average discharge voltage and a capacity retention rate.

Investigations will be given to the amount of halogen to be added to the positive electrode active material having a part of cobalt substituted for the heterogeneous element. It is apparent that the high temperature capacity retention rate is reduced by using the positive electrode active material having lithium fluoride added thereto such that the content of fluorine is 0.0007% by mass as in the battery L. The reason is that the degree of the reduction in the pH value is decreased and a deterioration in the high temperature cycle property is increased if the content of the fluorine is decreased.

On the other hand, it is apparent that the initial capacity and the high temperature capacity retention rate are reduced by using the positive electrode active material having the lithium fluoride added thereto such that the content of the fluorine is 7.0% by mass as in the battery O. The reason is that lithium cobalt oxide to be used for a charge and discharge is relatively decreased if the content of the fluorine is too increased.

On the contrary, it is apparent that the initial capacity and the high temperature capacity retention rate are more enhanced than those in the batteries L and O by using the positive electrode active material having lithium fluoride or lithium chloride added thereto such that the content of the fluorine is 0.001 to 5.0% by mass as in the batteries I, J, K, M, N, P, Q and R.

From the foregoing, it is preferable that the lithium fluoride or the lithium chloride should be added to the lithium cobalt oxide having a part of cobalt substituted for a heterogeneous element such that the content of fluorine is 0.001 to 5.0% by mass and they should be baked to have a crystallite size in a (110) vector direction of 1000 Å or more. Furthermore, it is more preferable that the lithium fluoride should be added to have a content of the fluorine of 0.01 to 0.3% by mass and they should be baked to have a crystallite size in the (110) vector direction of 1000 Å or more, resulting in an enhancement in the average discharge voltage and the high temperature cycle capacity retention rate.

Furthermore, investigations will be given to the difference in a type of halogen. By a comparison of the initial capacities and the high temperature capacity retention rates of the batteries I and J in which lithium cobalt oxide ($LiCo_{0.999}Ti_{0.001}O_2$) including a part of cobalt substituted for Ti to be the heterogeneous element has an equal content of halogen, it is apparent that the battery J containing chlorine should maintain a large initial capacity and a great high temperature capacity retention rate which are slightly lower than those of the battery I containing fluorine.

Consequently, it is preferable that the lithium cobalt oxide ($LiCo_{0.999}Ti_{0.001}O_2$) including a part of cobalt substituted for a heterogeneous element should be caused to contain halogen irrespective of the type of halogen. Even if another halogen such as bromine (Br), iodine (I) or astatine (At) is used in addition to fluorine and chlorine, the same effects can be obtained.

By a comparison of the battery X using the positive electrode active material according to the comparative example 5 in which the lithium fluoride is added to the spinel type lithium manganese oxide ($Li_{1.04}Mn_{1.86}Cr_{0.1}O_4$) having a part of manganese substituted for Cr to be a heterogeneous element with the battery Z using the positive electrode active material according to the reference example 2 to which the fluorine is not added, it is apparent that the high temperature cycle propertys are not enhanced at a capacity retention rate of 50% after 300 cycles. Accordingly, it is clear that the spinel type lithium manganese oxide and the lithium cobalt oxide have different effects from each other and the capacity retention rate cannot be enhanced even if the spinel type lithium manganese oxide contains fluorine.

As described above, in the invention, the synthesis conditions are optimized and the halogen compound is added at time of the synthesis of the hexagonal system lithium containing cobalt oxide having a crystallite size in the (110) direction of 1000 Å. Therefore, it is possible to obtain a nonaqueous electrolytic secondary battery having small deterioration in the high temperature cycle property and the capacity.

While the example in which titanium (Ti) is used as the heterogeneous element for substituting a part of cobalt of the hexagonal system lithium containing cobalt oxide has been described in the embodiment, the heterogeneous element for substituting a part of the cobalt of the hexagonal system lithium containing cobalt oxide may be selected from vanadium (V), chromium (Cr), iron (Fe), manganese (Mn), nickel (Ni) and aluminum (Al).

While the example in which the 3-component mixture mixing a first component comprising a lithium compound, a second compound comprising cobalt composite oxide having a part of cobalt substituted for Ti to be the heterogeneous metal, and a third component comprising a halogen compound is baked to form the hexagonal system lithium ccontaining cobalt oxide having a part of cobalt substituted for the heterogeneous element has been described in the embodiment, it is also possible to form the hexagonal system lithium containing cobalt oxide having a part of cobalt substituted for the heterogeneous element by burning a 4-compound mixture mixing a first component comprising a lithium compound, a second component comprising a cobalt compound such as cobalt oxide, a third component comprising a compound such as oxide containing at least one kind of element selected from V, Cr, Fe, Mn, Ni, Al and Ti, and a fourth component comprising a halogen compound when forming the hexagonal system lithium containing cobalt oxide having a part of cobalt substituted for the heterogeneous element.

For the negative electrode active material, moreover, it is also possible to use a carbon based material capable of intercalating and deintercalating a lithium ion, for example, carbon black, coke, glassy carbon, carbon fiber or their baked products in addition to natural graphite or to use metal oxide in which the electric potential of metal lithium, a lithium alloy such as a lithium-aluminum alloy, a lithium-lead alloy or a lithium-tin alloy, $SnO_2$, SnO, $TiO_2$ or $Nb_2O_3$ is lower than that of the positive electrode active material.

For the mixed solvent, furthermore, it is also possible to use an aprotic solvent having no capability to supply a hydrogen ion in addition to a mixture obtained by mixing diethyl carbonate (DEC) with the ethylene carbonate (EC) and to use an organic solvent such as propylene carbonate (PC), vinylene carbonate (VC) or butylene carbonate (BC), and a mixed solvent obtained by mixing them with a low boiling point solvent such as dimethyl carbonate (DMC), ethyl methyl carbonate (EMC), 1,2-diethoxyethane (DEE), 1,2-dimethoxyethane (DME) or ethoxy methoxy ethane (EME). For a solute to be dissolved in these solvents, moreover, it is also possible to use $LiBF_4$, $LiCF_3SO_3$, $LiAsF_6$, $LiN(CF_3SO_2)_2$, $LiC(CF_3SO_2)_3$ and $LiCF_3(CF_2)_3SO_3$ in addition to $LiPF_6$.

Furthermore, it is also possible to use an electrolyte such as a polymer electrolyte, a gel-like electrolyte obtained by impregnating a nonaqueous electrolyte in polymer or a solid electrolyte without departing from the scope of the invention.

What is claimed is:

1. A method of manufacturing a nonaqueous electrolytic secondary battery including a positive electrode active material capable of intercalating and deintercalating a lithium ion, a negative electrode active material capable of intercalating and deintercalating the lithium ion, and a nonaqueous electrolyte, comprising the steps of:

mixing a first component having a lithium compound, a second component having a cobalt compound, and a third component having a halogen compound to obtain a 3-component mixture; and burning the 3-component mixture to obtain a hexagonal system lithium containing cobalt composite having a crystallite size in a (110) vector direction of 1000Å or more, wherein the cobalt compound is a tricobalt-tetraoxide ($Co_3O_4$) having a specific surface area of at least 8.3 $m^2/g$.

2. The method of manufacturing a nonaqueous electrolytic secondary battery according to claim 1, wherein the halogen compound is added such that a content of a halogen component to a mass of the positive electrode active material is 0.001% by mass to 5.0% by mass.

3. The method of manufacturing a nonaqueous electrolytic secondary battery according to claim 1, wherein the halogen compound is lithium fluoride.

4. The method of manufacturing a nonaqueous electrolytic secondary battery according to claim 2, wherein the halogen compound is lithium fluoride.

5. A method of manufacturing a nonaqueous electrolytic secondary battery including a positive electrode active material capable of intercalating and deintercalating a lithium ion, a negative electrode active material capable of intercalating and deintercalating the lithium ion, and a nonaqueous electrolyte, comprising the steps of:

mixing a first component having a lithium compound, a second component including a cobalt composite compound having a part of cobalt substituted for at least one kind of heterogeneous element selected from the group consisting of V, Cr, Fe, Mn, Ni, Al and Ti, and a third component having a halogen compound to obtain a 3-component mixture; and burning the 3-component mixture to obtain a hexagonal system lithium containing cobalt composite having a crystallite size in a (110) vector direction of 1000Å or more, wherein the cobalt composite compound having a part of cobalt substituted for heterogeneous element is a tricobalt-tetraoxide ($Co_3O_4$) having a part of cobalt substituted for heterogeneous element, further wherein the tricobalt-tetraoxide ($Co_3O_4$) having a part of cobalt substituted for heterogeneous element has a specific surface area of at least 8.3 $m^2/g$.

6. The method of manufacturing a nonaqueous electrolytic secondary battery according to claim 5, wherein the halogen compound is added such that a content of a halogen component to a mass of the positive electrode active material is 0.001% by mass to 5.0% by mass.

7. The method of manufacturing a nonaqueous electrolytic secondary battery according to claim 5, wherein the halogen compound is lithium fluoride.

8. The method of manufacturing a nonaqueous electrolytic secondary battery according to claim 6, wherein the halogen compound is lithium fluoride.

9. A method of manufacturing a nonaqueous electrolytic secondary battery including a positive electrode active material capable of intercalating and deintercalating a lithium ion, a negative electrode active material capable of intercalating and deintercalating the lithium ion, and a nonaqueous electrolyte, comprising the steps of:

mixing a first component having a lithium compound, a second component having a cobalt compound, a third component having a compound containing at least one kind of element selected from the group consisting of V, Cr, Fe, Mn, Ni, Al and Ti, and a fourth component having a halogen compound to obtain a 4-component mixture; and burning the 4-component mixture to obtain a hexagonal system lithium containing cobalt composite having a crystallite size in a (110) vector direction of 1000Å or more, wherein the cobalt compound is a tricobalt-tetraoxide ($Co_3O_4$) having a specific surface area of at least 8.3 $m^2$/g.

10. The method of manufacturing a nonaqueous electrolytic secondary battery according to claim 9, wherein the halogen compound is added such that a content of a halogen component to a mass of the positive electrode active material is 0.001% by mass to 5.0% by mass.

11. The method of manufacturing a nonaqueous electrolytic secondary battery according to claim 9, wherein the halogen compound is lithium fluoride.

12. The method of manufacturing a nonaqueous electrolytic secondary battery according to claim 10, wherein the halogen compound is lithium fluoride.

13. The method of manufacturing a nonaqueous electrolytic secondary battery according to claim 1, wherein the 3-component mixture is burned in air.

14. The method of manufacturing a nonaqueous electrolytic secondary battery according to claim 5, wherein the 3-component mixture is burned in air.

15. The method of manufacturing a nonaqueous electrolytic secondary battery according to claim 9, wherein the 4-component mixture is burned in air.

* * * * *